No. 657,249. Patented Sept. 4, 1900.
A. B. PRATT.
MEASURING DEVICE.
(Application filed Mar. 21, 1900.)
(No Model.)
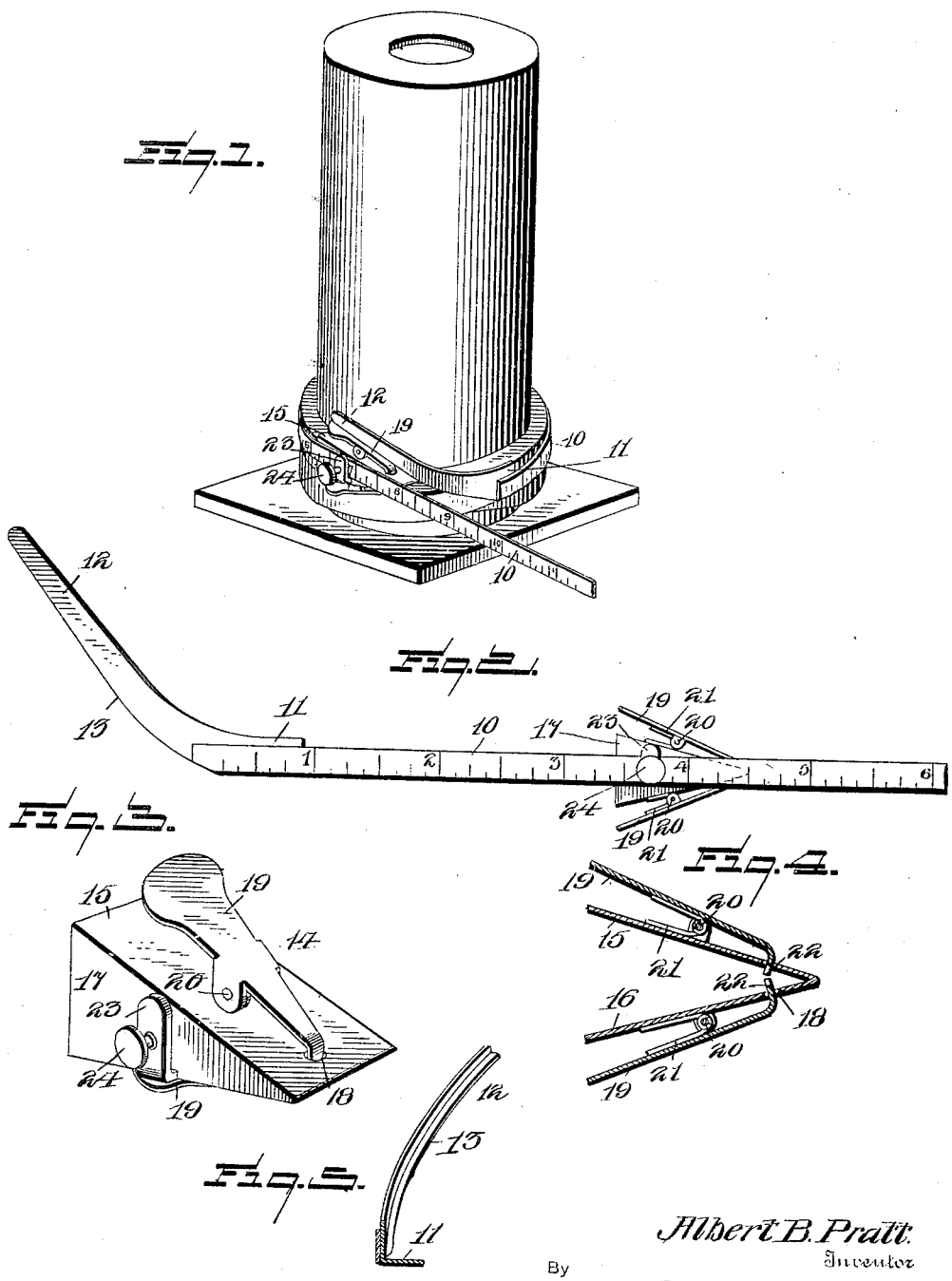
Albert B. Pratt,
Inventor

UNITED STATES PATENT OFFICE.

ALBERT B. PRATT, OF SOMERVILLE, MASSACHUSETTS.

MEASURING DEVICE.

SPECIFICATION forming part of Letters Patent No. 657,249, dated September 4, 1900.

Application filed March 21, 1900. Serial No. 9,594. (No model.)

*To all whom it may concern:*

Be it known that I, ALBERT B. PRATT, a citizen of the United States, residing at Somerville, in the county of Middlesex and State of Massachusetts, have invented a new and useful Measuring Device, of which the following is a specification.

My invention relates to improvements in measuring devices especially designed for use in obtaining a proper length of material from a spirally-coiled section of packing sufficient to form a packing-ring for use as a piston or other packing.

The measuring device of the present invention includes a pliable tape and means for holding the same on or against a coiled length of packing which may be confined on a holder, one type of the latter being more fully disclosed in a separate application for improvements in cartons or shipping packages (Serial No. 9,595) filed by me of even date herewith. Said measuring device is equipped with means by which it may be readily applied to the angular cut on one end of the coiled packing, and it also includes means serving to direct a scoring-point at an angle similar to the base or first cut of the packing, whereby the predetermined length of packing measured off by the device has its end portions provided with corresponding angles, which enable the end portions of the cut length to overlap in the formation or application of the ring packing.

Further objects and advantages of the invention will appear in the course of the subjoined description, and the novelty in the construction, combination, and adaptation of parts will be defined by the claims.

In the drawings, Figure 1 is a perspective view of my measuring device applied to a spiral packing in a position for measuring off a length of the latter. Fig. 2 is an elevation of the measuring device with the pliable tape in a straight condition. Fig. 3 is a detail perspective view of the clip removed from the tape. Fig. 4 is a longitudinal sectional view through the clip, illustrating one style of the clamp. Fig. 5 is a detail view of the end piece adapted to serve as a scoring-guide.

The same numerals of reference are used to indicate corresponding parts in each of the several figures of the drawings.

One element of my improved measuring device is a pliable or flexible tape 10, which is scored or otherwise indelibly inscribed with transverse divisions to denote the measurement in inches or fractions thereof. In practice I prefer to make this pliable tape of metal and to provide the scale or scales on one or both faces thereof in a manner familiar to those skilled in the art of manufacturing measuring-tapes, and I would therefore have it understood that my invention is not restricted to any particular kind of tape. An end piece 11 is firmly united in any approved way to one end of the pliable tape. This end piece is angular in cross-section to present a surface which will accurately fit upon a packing of square cross-sectional form, and this end piece is provided with an elongated scoring-finger 12, which is preferably made as an integral part of the same and is provided with a narrow scoring or knife edge 13, disposed at an angle to the finger and extending along its lower edge. Said finger is extended or prolonged for a suitable distance beyond the angular part of the end piece, and said finger is disposed at an angle to the axis of the angular end piece, as shown in Fig. 5 of the drawings. When the measuring instrument is employed in connection with a spiral packing, which is contained on a cylindrical holder of the character disclosed in my other application, to which reference has been made, I prefer to curve the elongated finger of the end piece in order that it may be accurately fitted against a part of the spiral packing, and when the parts shown are properly assembled with relation to the packing this finger has its scoring edge 13 extended across the exposed edge or face of the packing, whereby the edge 13 cuts a definite score in the face of the packing at the desired angle to facilitate the scoring of packing.

One of the important elements of my improved measuring device consists of a clip or work-receiving cap 14, which is adapted to be applied to the end of the spiral packing, said cap having two independent fastening devices, one of which serves as the means for holding the cap itself on the end of the packing, while the other clamping device serves to adjustably confine the measuring-tape on the cap. In the embodiment of the invention shown in the drawings the cap 14 is represented in a form which adapts it to accurately fit the angular or beveled end of a spiral packing, which in cross-section is substantially square; but I would have it understood that this cap may be fashioned to properly fit upon spirally-coiled packings, which may be circular, oval, or any other shape in cross-section. The cap represented by the drawings has two walls 15 16, disposed in divergent relation and joined at one edge by a side 17, the whole forming a box-shaped cap, which is opened at one end and at one side. The openings in the end and side of the cap enable the latter to be easily fitted on the end of the spiral packing, and the divergent relation of the walls forming a part of the cap provides for the snug fitting of said cap upon the beveled end of the packing, whereby the cap may be easily and accurately fitted to the packing. The converging walls of the cap are provided near their meeting ends with transverse openings adapted to receive the nibs or beaks on the members 19 of the clamp, with which the clip or cap is provided for holding itself upon the packing. The members 19 are pivoted at 20 on the outside of the cap, said members being normally pressed toward each other by a spring or springs 21, that force the beaks 22 through the openings 18. The members of the clamp are readily accessible, so that they may be grasped by the fingers and compressed against the tension of their springs, and thereby withdraw the beaks from the openings of the clip; but on releasing the clamp members the springs become active and the members are pressed into position for the beaks 22 to grip the end of the packing upon which the box-like cap is fitted. The other clamp for the adjustable attachment of the tape to the cap consists of an arm 23, which is made fast or integral with the cap and is disposed to lie parallel with the closed side 17 of said cap. This arm is offset from said closed side of the cap sufficiently to leave an intervening space or opening for the reception of the measuring-tape 10, and said arm is furthermore provided with a threaded opening adapted for the reception of a binding-screw 24, the latter serving to grip the measuring-tape between itself and the closed side 17 of the cap.

Although I have illustrated and described in detail special types of clamping devices, both of which are carried by the cap and which are adapted, respectively, to hold the cap on the packing and to adjustably confine the measuring-tape to the cap, I would have it understood that my invention is not strictly limited to the special type of clamps, because the same may be modified by the skilled constructor.

It is well known to those skilled in the art that it is customary to cut off a length of packing from a spirally-coiled section sufficient to form a ring to be used in packing pistons and other moving parts of machinery, and, furthermore, that the cut is always made at an angle for the purpose of having the ends of the severed length overlap one another in the application of the ring to the piston or other part.

The ordinary manipulation of my measuring device is as follows: The length of the packing required to make the ring intended for use is first ascertained in any desired manner, and the cap 14 is adjusted to the proper position upon the tape, according to the length of packing required, and is secured by screwing down the screw 24. The cap is then secured in the manner described upon the end of the spiral packing, after which that portion of the tape intermediate of the cap and end piece is wound around the packing, which will bring the end piece at the desired distance from the cap, thus measuring off the desired length of packing. The angular portion of the end piece extends between the convolutions of the spiral packing, properly retaining and locating the finger 12, which is now pressed to cause its scoring or knife edge 13 to sink into the surface of the packing along the angular line upon which it is desired to sever it. The measuring device is now removed, and the section of packing required to complete the ring to be made is severed by passing a knife or other cutting implement along the score produced by the scoring edge of the finger. It is evident that by means of my device any desired length or lengths of packing may be severed from a continuous spiral wound upon the holder without the necessity for removing any of the packing except the piece or pieces required for immediate use.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having described my invention, what I claim is—

1. A measuring device of the class described comprising a measuring-tape, a work-receiving cap designed to receive the work between its walls, and independent clamps mounted on the cap and adapted to respectively hold the cap on the work, and adjustably confine the tape with relation to the cap, substantially as and for the purposes set forth.

2. A measuring device of the class described comprising a box-like cap constructed to fit the beveled end of a packing, means for holding said cap against displacement on the packing, a pliable tape adapted to be fitted to the cap, and means for clamping the tape at any point of adjustment with relation to the cap, as and for the purposes set forth.

3. A measuring device of the class described comprising a box-like cap having the convergent walls and an offset arm, a clamp carried by the cap and adapted to project into the opening or space thereof, a measuring-tape slidably fitted between the offset arm and a portion of the cap, and means for clamping the tape adjustably to the cap, substantially as set forth.

4. A measuring device of the class described comprising a cap having suitable clamping devices, a measuring-tape fitted to the cap, and an end piece provided with an angular scoring edge, as and for the purposes set forth.

5. In a measuring device of the class described, a measuring-tape, and an end piece carried by the tape and provided with a finger having an angular scoring edge, combined with means for adjustably holding the measuring-tape with relation to the work, as set forth.

6. In a measuring device of the class described, a tapered cap, and the sectional clamp mounted thereon and having means adapted to engage with the work, in combination with the measuring-tape, and a clamp independent of the first-named clamp and engaging with said tape for holding the latter adjustably on the cap, as set forth.

7. In a measuring device of the class described, a tapered cap provided with transverse openings near its closed end, an offset arm parallel to one side of the cap, a two-part clamp mounted exteriorly on the cap and having beaks arranged to pass through the openings in the cap, and a binding-screw mounted in said arm, combined with a measuring-tape insertible in the space between the cap and the arm, whereby the tape may be clamped between the cap and the binding-screw, substantially as set forth.

8. A work-receiving cap for measuring devices, said cap comprising angularly-related integral walls, each of said walls being provided with an independent clamp.

In testimony that I claim the foregoing as my own I have hereto affixed my signature in the presence of two witnesses.

ALBERT B. PRATT.

Witnesses:
  CHARLES A. JEWELL,
  CHARLES H. LIBBEY.